(12) United States Patent
Lee et al.

(10) Patent No.: US 11,447,971 B1
(45) Date of Patent: Sep. 20, 2022

(54) ENERGY DISSIPATION DEVICE (71) Applicant: WELL-LINK INDUSTRY Co., LTD, New Taipei (TW)

(72) Inventors: Chun-Lung Lee, New Taipei (TW); Yi Chang Hsieh, New Taipei (TW); Yu Li Huang, New Taipei (TW)

(73) Assignee: WELL-LINK INDUSTRY Co., LTD, New Taipei (TW)

( * ) Notice: Subject to any disclaimer, the term of this patent is extended or adjusted under 35 U.S.C. 154(b) by 0 days.

(21) Appl. No.: 17/330,434

(22) Filed: May 26, 2021

(30) Foreign Application Priority Data

Mar. 5, 2021 (TW) .................................. 110107892

(51) Int. Cl.
*E04B 1/98* (2006.01)
*E04H 9/02* (2006.01)
*E04C 3/04* (2006.01)

(52) U.S. Cl.
CPC ............. *E04H 9/021* (2013.01); *E04H 9/02* (2013.01); *E04B 1/98* (2013.01); *E04C 2003/0439* (2013.01); *E04H 9/0235* (2020.05)

(58) Field of Classification Search
CPC ..... E04B 1/98; E04B 9/02; E04C 3/02; E04C 2003/043; E04C 2003/0439; E04H 9/0235; E04H 9/02; E04H 9/0237; E04H 9/024; E04H 9/025; E04H 9/027; E04H 9/029; E04H 9/028; E04H 9/021
See application file for complete search history.

(56) References Cited

U.S. PATENT DOCUMENTS

| | | | | |
|---|---|---|---|---|
| 2,384,279 A * | 9/1945 | Calhoun | ............... | E04H 12/182 254/387 |
| 3,248,831 A * | 5/1966 | Jones | ...................... | H01Q 1/10 52/121 |
| 5,347,771 A * | 9/1994 | Kobori | ................... | E04H 9/0235 188/312 |
| 5,743,362 A * | 4/1998 | Clinard | ................. | F16F 9/3415 188/276 |
| 8,763,320 B1 * | 7/2014 | Chou | ...................... | E04H 12/16 52/167.3 |
| 11,193,295 B1 * | 12/2021 | Proctor | ................. | E04H 9/0237 |
| 2003/0221389 A1 * | 12/2003 | Smelser | .................... | E04C 3/02 52/853 |
| 2004/0190981 A1 * | 9/2004 | Tsai | ...................... | E04H 9/0237 403/293 |

(Continued)

FOREIGN PATENT DOCUMENTS

| | | |
|---|---|---|
| CN | 205189160 | 4/2016 |
| CN | 205329891 | 6/2016 |

(Continued)

OTHER PUBLICATIONS

"Office Action of Taiwan Counterpart Application", dated Dec. 15, 2021, p. 1-p. 3.

*Primary Examiner* — Phi D A
(74) *Attorney, Agent, or Firm* — JCIPRNET (57) ABSTRACT

An energy dissipation device includes an inner tube, a core tube, an outer tube and a fixing member. The inner tube includes a first protruding structure. The core tube includes a second protruding structure, and the core tube is sleeved outside the inner tube. The outer tube is sleeved outside the core tube. The fixing member is connected to the inner tube, the core tube and the outer tube.

7 Claims, 7 Drawing Sheets

(56) References Cited

U.S. PATENT DOCUMENTS

| | | | | |
|---|---|---|---|---|
| 2008/0016794 | A1* | 1/2008 | Tremblay | E04H 9/0237 |
| | | | | 52/167.4 |
| 2012/0000147 | A1* | 1/2012 | Chou | E04H 9/0237 |
| | | | | 52/167.1 |
| 2014/0231197 | A1* | 8/2014 | Watanabe | E04H 9/0235 |
| | | | | 188/290 |
| 2015/0152609 | A1* | 6/2015 | Lathan | E01D 19/125 |
| | | | | 405/224 |
| 2016/0237711 | A1* | 8/2016 | Powell | E04H 9/027 |
| 2016/0326742 | A1* | 11/2016 | Haque | E04C 3/02 |
| 2017/0016504 | A1* | 1/2017 | Braun | F16F 7/128 |
| 2017/0030701 | A1* | 2/2017 | Saxey | E04H 9/024 |
| 2017/0089063 | A1* | 3/2017 | Espinosa | E04B 1/4121 |
| 2017/0131259 | A1* | 5/2017 | Saleem | G01N 3/24 |
| 2017/0145686 | A1* | 5/2017 | Lee | E04G 23/0218 |
| 2018/0105135 | A1* | 4/2018 | Keats | F16F 7/116 |
| 2020/0011051 | A1 | 1/2020 | Hou et al. | |
| 2020/0362585 | A1* | 11/2020 | Hou | E04H 9/021 |
| 2021/0148434 | A1* | 5/2021 | Fu | E04H 9/0237 |
| 2021/0207358 | A1* | 7/2021 | Jin | E04H 9/024 |

FOREIGN PATENT DOCUMENTS

| | | | | |
|---|---|---|---|---|
| TW | M261523 | | 4/2005 | |
| TW | M317457 | | 8/2007 | |
| TW | 201802328 | | 1/2018 | |
| WO | WO-03071052 A1 * | | 8/2003 | F16F 9/103 |

* cited by examiner

ENERGY DISSIPATION DEVICE

CROSS-REFERENCE TO RELATED APPLICATION

This application claims the priority benefit of Taiwan application serial no. 110107892, filed on Mar. 5, 2021. The entirety of the above-mentioned patent application is hereby incorporated by reference herein and made a part of this specification.

BACKGROUND

Technical Field

The disclosure relates to an energy dissipation device, and more particularly to an energy dissipation device with a steel tube structure. Description of Related Art Among the existing methods for improving the seismic capacity of structures, a buckling-restrained brace (BRB) is an earthquake-resistant technology that has been applied to buildings in recent years. At present, most buckling-restrained braced frames (BRBFs) include a core element, a tube sleeved on the core element, and a filler (such as concrete) filled between the tube and the core element. However, since concrete curing takes a long time, such a method is time-consuming and labor-intensive, and the heavy weight is not conducive to installation.

SUMMARY

The disclosure provides an energy dissipation device whose manufacturing process is simple, fast and suitable for mass production.

An energy dissipation device according to the disclosure includes an inner tube, a core tube, an outer tube and a fixing member. The inner tube includes a first protruding structure. The core tube includes a second protruding structure, and the core tube is sleeved outside the inner tube. The outer tube is sleeved outside the core tube. The fixing member is connected to the inner tube, the core tube and the outer tube.

In an embodiment of the disclosure, there is a first gap between the first protruding structure and an inner wall of the core tube, and there is a second gap between the second protruding structure and an inner wall of the outer tube.

In an embodiment of the disclosure, the inner tube has two opposite first ends and a first middle part between the two first ends, and the first protruding structure is disposed on the first middle part, and the core tube has two opposite second ends and a second middle part between the two second ends, and the second protruding structure is disposed on the second middle part.

In an embodiment of the disclosure, the first protruding structure includes a plurality of first protrusions, and the first protrusions are disposed on the inner tube at equal intervals, and the second protruding structure includes a plurality of second protrusions, and the second protrusions are disposed on the core tube at equal intervals.

In an embodiment of the disclosure, a projection range of the first protrusions on the outer tube overlaps a projection range of the second protrusions on the outer tube.

In an embodiment of the disclosure, the core tube has a weakened structure, and the weakened structure is disposed circumferentially on the second middle part.

In an embodiment of the disclosure, the weakened structure includes a plurality of first U-shaped through grooves and a plurality of second U-shaped through grooves, and the first U-shaped through grooves and the second U-shaped through grooves are respectively located on two sides of the second protruding structure.

In an embodiment of the disclosure, each of the first U-shaped through grooves has a first curved section and a first non-curved section, and each of the second U-shaped through grooves has a second curved section and a second non-curved section, and the first curved sections and the second curved sections are close to the corresponding second ends, respectively, and ends of the first non-curved sections and ends of the second non-curved sections face each other and extend toward the second protruding structure.

In an embodiment of the disclosure, the first protruding structure and the second protruding structure are respectively protruding rings and are disposed circumferentially on the inner tube and the core tube, or the first protruding structure and the second protruding structure are respectively protruding strips and are disposed on the inner tube and the core tube along length directions of the inner tube and the core tube.

In an embodiment of the disclosure, the core tube, the inner tube and the outer tube are hollow steel tubes, and a length of the core tube is greater than a length of the inner tube and also greater than a length of the outer tube.

Based on the above, in the energy dissipation device of the disclosure, the outer tube, the core tube and the inner tube are sleeved and connected to each other in sequence; the inner tube includes the first protruding structure, and the core tube includes the second protruding structure; and the inner tube, the core tube and the outer tube are connected to each other by the fixing member. When the core tube is under force, the outer tube and the inner tube are configured to prevent the core tube from being laterally buckled. In this way, the energy dissipation device may be configured to withstand the reaction force of the interlayer displacement of the building caused by the earthquake and reduce the structural damage of the building caused by the interlayer displacement. That is, the core tube may withstand tension and pressure and may weaken the seismic wave energy received by the building by entering the material yield stage, thereby reducing the damage caused by the earthquake. In this way, the energy dissipation device of the disclosure omits the process of filling a filler, and its manufacturing process is simple, fast and suitable for mass production.

In order to make the aforementioned features and advantages of the disclosure comprehensible, embodiments accompanied with drawings are described in detail below.

DESCRIPTION OF THE EMBODIMENTS

Figure 1:
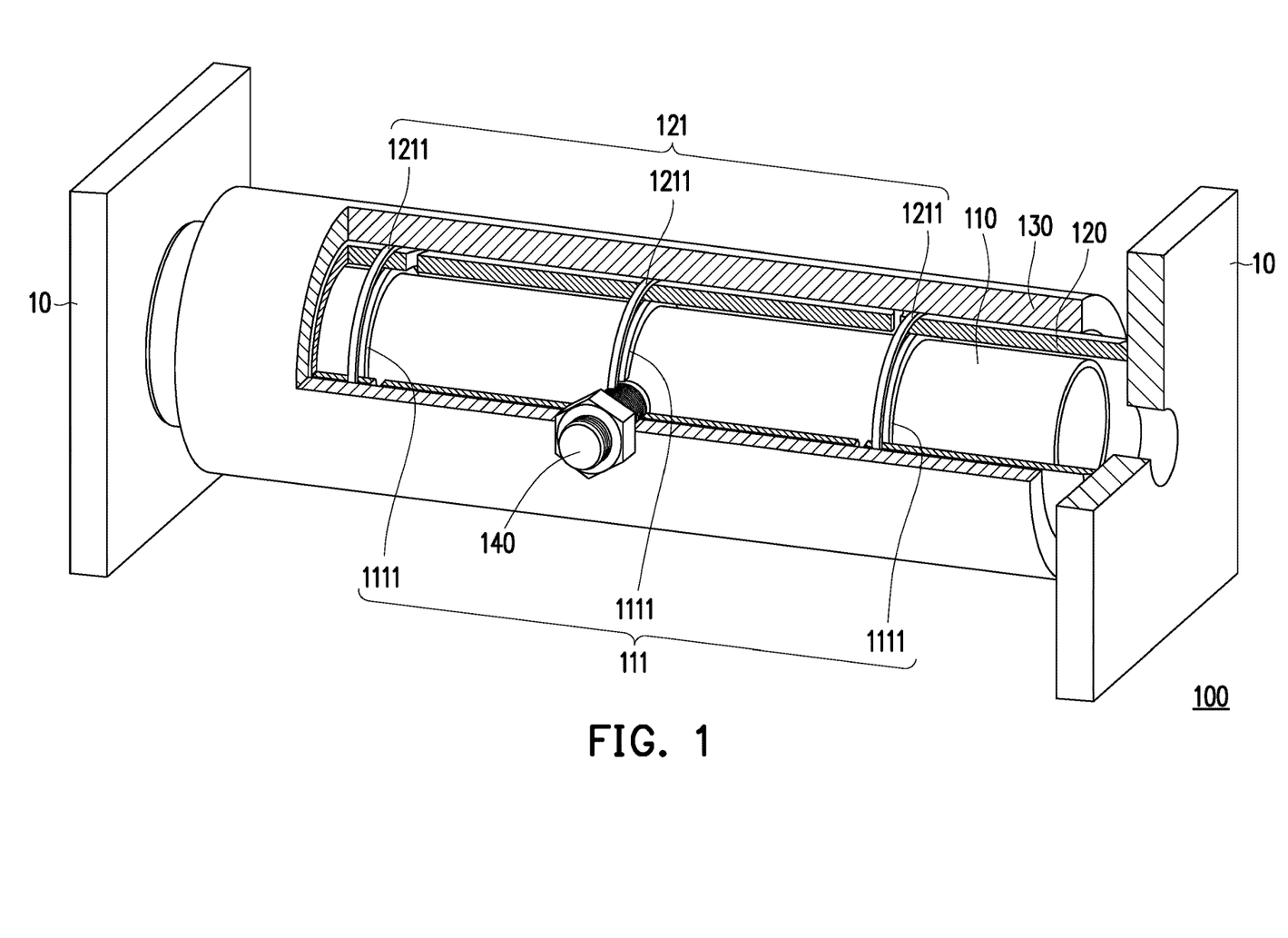
FIG. 1 is a schematic perspective view of an energy dissipation device according to an embodiment of the disclosure.
Figure 2:
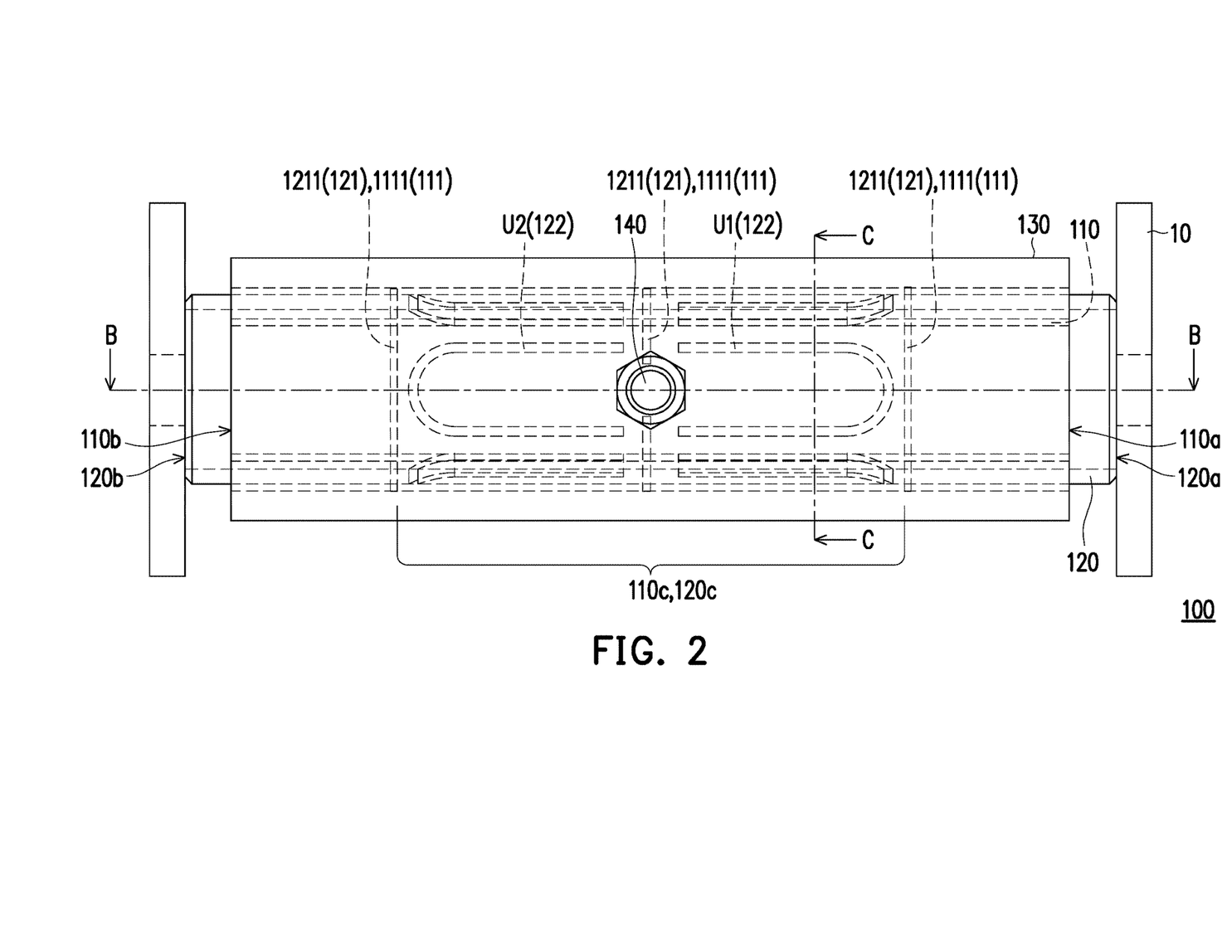
FIG. 2 is a front view of the energy dissipation device of FIG. 1.

FIG. 1 is a schematic perspective view of an energy dissipation device according to an embodiment of the disclosure. FIG. 2 is a front view of the energy dissipation device of FIG. 1. In order to make the drawing clearer, a part of the energy dissipation device 100 in FIG. 1 is shown in a sectional way. Please refer to FIGS. 1 and 2. In this embodiment, the energy dissipation device 100 includes an inner tube 110, a core tube 120, an outer tube 130 and a fixing member 140. The inner tube 110 includes a first protruding structure 111. The core tube 120 includes a second protruding structure 121, and the core tube 120 is sleeved outside the inner tube 110. The outer tube 130 is sleeved outside the core tube 120.

Specifically, the inner tube 110, the core tube 120 and the outer tube 130 are hollow steel tubes. The core tube 120 is sleeved outside the inner tube 110. The outer tube 130 is sleeved outside the core tube 120. The outer tube 130, the core tube 120 and the inner tube 110 are sleeved and connected to each other in sequence. The energy dissipation device 100 shown in FIG. 1 only schematically shows the relative position of each element in a simple way, and is for reference only. The wall thickness of the inner tube 110, the core tube 120 and the outer tube 130 may be designed according to the load, and appropriate adjustments may be made, and the disclosure is not limited thereto. Here, the diameters used for the inner tube 110, the core tube 120 and the outer tube 130 are all standardized products, whereby the processing and manufacturing time may be shortened. In other embodiments, the inner tube 110, the core tube 120 and the outer tube 130 may be solid and are not limited to round tubes.

Figure 3A:
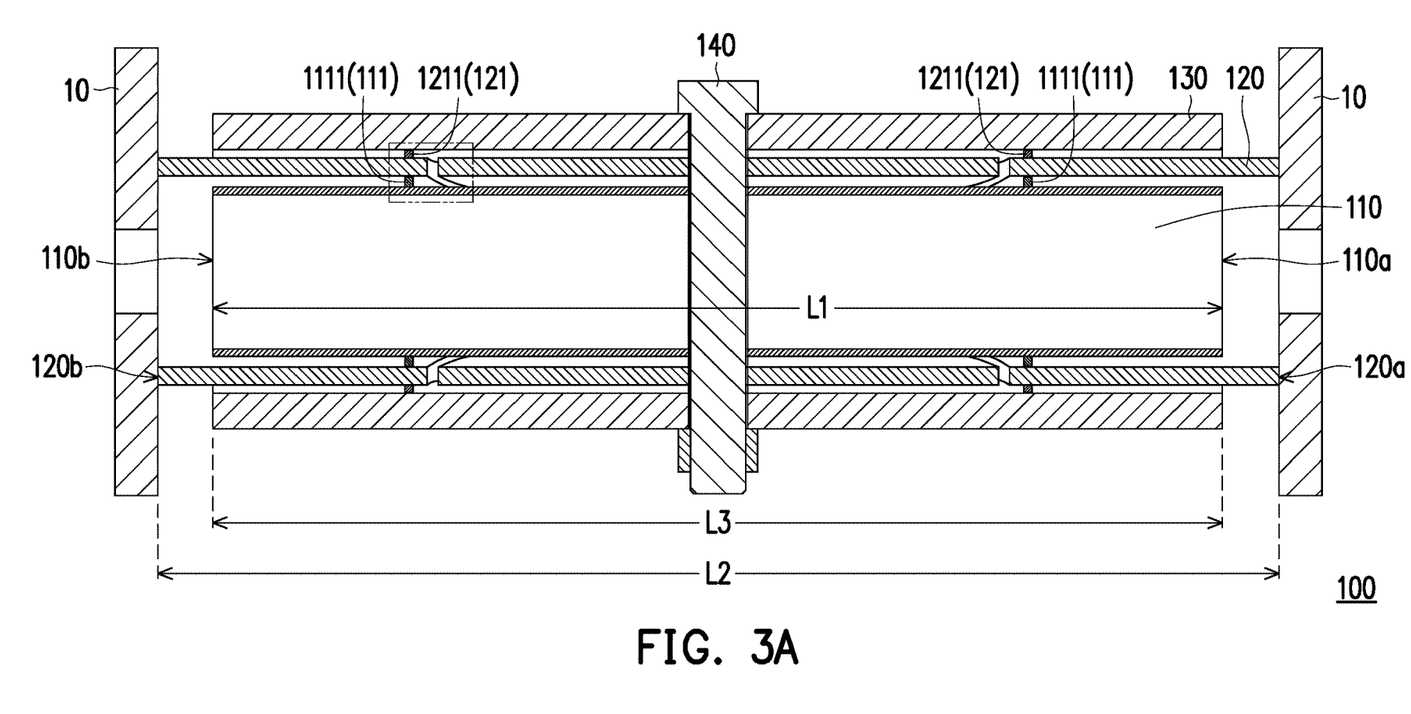
FIG. 3A is a cross-sectional view of the energy dissipation device of FIG. 2 taken along the line B-B.
Figure 3B:
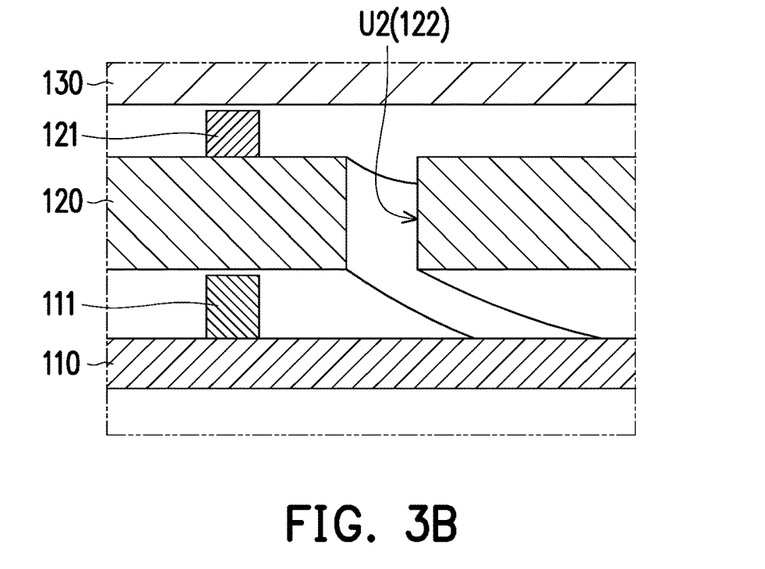
FIG. 3B is a partial enlarged view of the energy dissipation device of FIG. 3A.

FIG. 3A is a cross-sectional view of the energy dissipation device of FIG. 2 taken along the line B-B. FIG. 3B is a partial enlarged view of the energy dissipation device of FIG. 3A.

Figure 4:
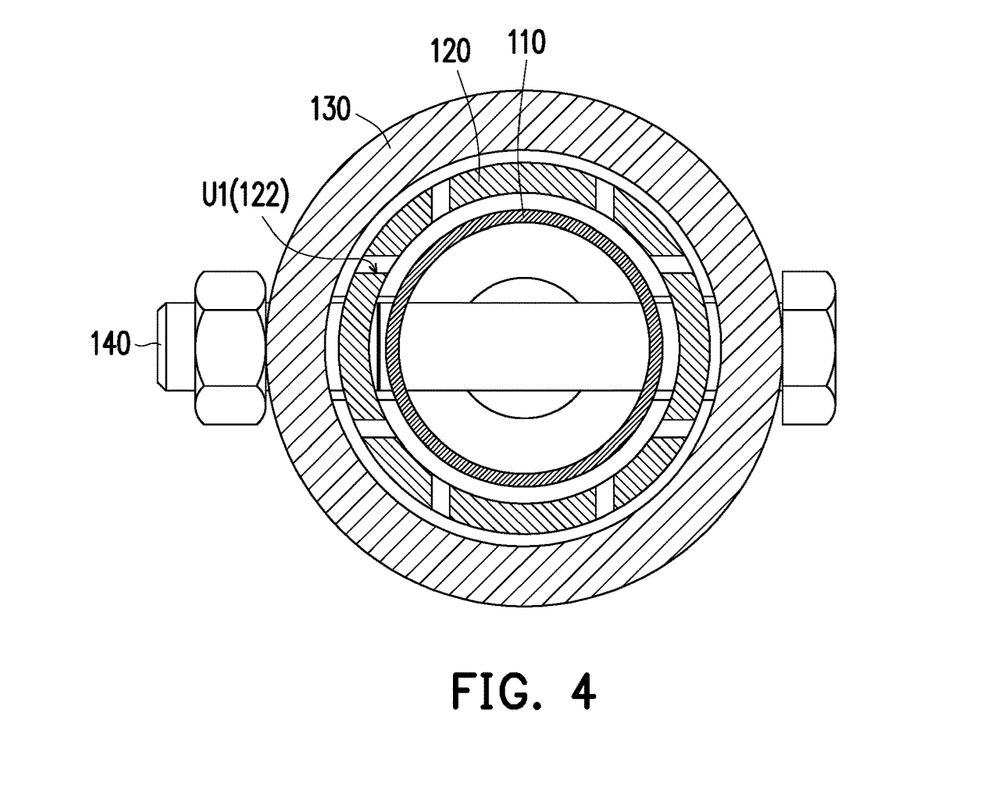
FIG. 4 is a cross-sectional view of the energy dissipation device of FIG. 2 taken along the line C-C.

FIG. 4 is a cross-sectional view of the energy dissipation device of FIG. 2 taken along the line C-C. In the embodiment, the core tube 120 is adapted for connecting an external structure, such as a structural frame, and the inner tube 110 and the outer tube 130 are buckling-restrained braced tubes configured to prevent the core tube 120 from being laterally buckled. Here, the core tube 120 is connected to adapter plates 10, and the adapter plates 10 are configured to transmit power and are adapted for being interposed between the core tube 120 and the structural frame. In the embodiment, the length L2 of the core tube 120 is greater than the length L1 of the inner tube 110 and also greater than the length L3 of the outer tube 130. In this way, the outer tube 130 and the inner tube 110 do not contact the adapter plates 10, and thus may avoid being under the force from the external structure.

In the embodiment, the fixing member 140 is connected to the inner tube 110, the core tube 120 and the outer tube 130. The fixing member 140 is configured to fix the relative positions of the inner tube 110, the core tube 120 and the outer tube 130 so that the inner tube 110 and the core tube 120 are not in direct contact, and the core tube 120 and the outer tube 130 are not in direct contact. Here, the fixing member 140 is, for example, a bolt, and may work together with a nut. The bolt penetrates the core tube 120 and the inner tube 110 from one side of the outer tube 130 to the other side of the outer tube 130 to fix the positions of the inner tube 110, the core tube 120 and the outer tube 130 to avoid slippage between the inner tube 110, the core tube 120 and the outer tube 130.

Further, please refer to FIG. 3B. There is a gap between the first protruding structure 111 and the inner wall of the core tube 120, and there is a gap between the second protruding structure 121 and the inner wall of the outer tube 130.

With the above configuration, when the core tube 120 is deformed laterally under pressure, the core tube 120 will first push against the first protruding structure 111, or the second protruding structure 121 of the core tube 120 will push against the outer tube 130, so that the lateral deformation is restrained, whereby the yield strength may be stably developed.

Therefore, when the building is subjected to an earthquake, the first protruding structure 111 and the second protruding structure 121 are able to increase the restraining effect, whereby the energy dissipation device 100 may exert the good toughness of the steel member to absorb the seismic energy, so as to reduce the earthquake damage to the building. In this way, the step of pouring concrete required in the conventional method is omitted, and the effects of lighter weight, shorter manufacturing process and increased personnel's production efficiency may be achieved.

In detail, in the embodiment, the inner tube 110 has two opposite first ends 110a and 110b and a first middle part 110c between the two first ends 110a and 110b. The core tube 120 has two opposite second ends 120a and 120b and a second middle part 120c between the two second ends 120a and 120b. The first protruding structure 111 of the embodiment includes a plurality of first protrusions 1111 (three are schematically shown in the figures), and the first protrusions 1111 are disposed on the inner tube 110 at equal intervals. The second protruding structure 121 includes a plurality of second protrusions 1211 (three are schematically shown in the figures), and the second protrusions 1211 are disposed on the core tube 120 at equal intervals. In the embodiment, the first protruding structure 111 and the second protrusions 1211 are respectively connected to the inner tube 110 and the core tube 120 by welding. Compared with the conventional steel lateral bracing, there are fewer welding sections on the inner tube 110 and the core tube 120, which may reduce the processing time.

Here, the first protrusions 1111 are disposed corresponding to places where the deformation amount of the core tube 120 is relatively large, and are, for example, disposed at ¼, ½, and ¾ positions in the length direction of the inner tube 110. The second protrusions 1211 are disposed corresponding to places where the deformation amount of the core tube 120 is relatively large, and are, for example, disposed at ¼, ½, and ¾ positions in the length direction of the core tube 120, but they are not limited thereto. In other embodiments, the protrusions may be disposed at ⅞, ⅝, ⅜, and ⅛ positions in the length direction of the tube to achieve a restraining effect.

In the embodiment, the projection range of the first protrusions 1111 on the outer tube 130 overlaps the projection range of the second protrusions 1211 on the outer tube 130. In other words, the first protrusions 1111 correspond to the second protrusions 1211.

In an embodiment, the first protruding structure 111 is a protruding ring and continuously surrounds the inner tube 110, and the second protruding structure 121 is a protruding ring and continuously surrounds the core tube 120. In an embodiment, the first protruding structure 111 is a protruding strip and discontinuously surrounds the inner tube 110, and the second protruding structure 121 is a protruding strip and discontinuously surrounds the core tube 120. In an embodiment, the first protruding structure 111 may be a single structure and disposed circumferentially on the first middle part 110c. The second protruding structure 121 may also be a single structure and disposed circumferentially on the second middle part 120c. In other embodiments, the thickness, number, or density of the first protruding structure 111 and the second protruding structure 121 may be adjusted in other appropriate ways, and the shape of the protruding structures may be a strip, a ring, or other shapes that may achieve the purpose, and the disclosure is not limited thereto. In addition, in the embodiment, the fixing member 140 is disposed at the second middle part 120c of the core tube 120 and the first middle part 110c of the inner tube 110, but the disclosure is not limited thereto.

Figure 5:
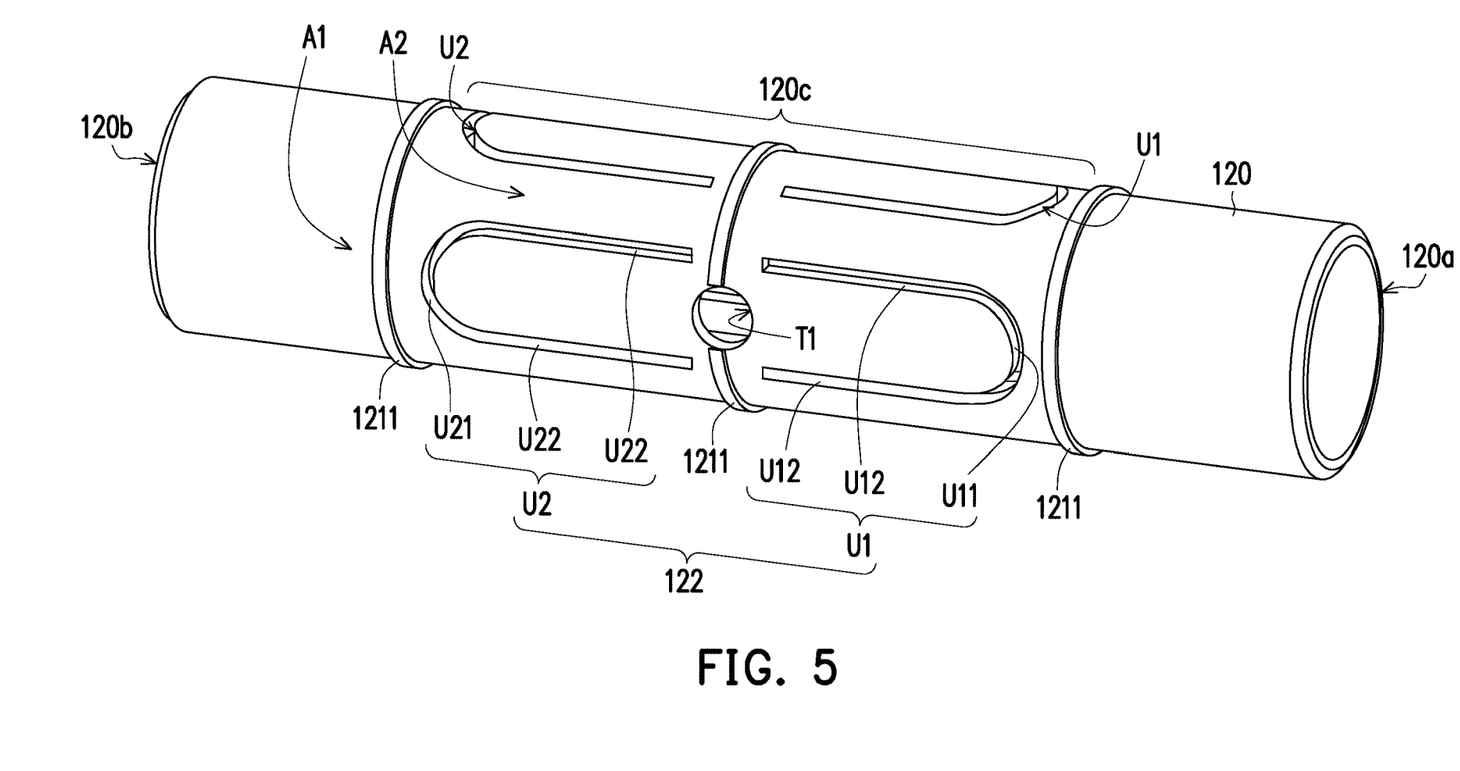
FIG. 5 is a schematic perspective view of the core tube of FIG. 1.

FIG. 5 is a schematic perspective view of the core tube of FIG. 1. Please refer to FIG. 5. In the embodiment, the core tube 120 has a weakened structure 122, and the weakened structure 122 is disposed circumferentially on the second middle part 120c. This design may allow the stress to be concentrated in the core section (that is, the second middle part 120c), and may use the core section to absorb energy.

In the embodiment, the weakened structure 122 includes a plurality of first U-shaped through grooves U1 and a plurality of second U-shaped through grooves U2, and the first U-shaped through grooves U11 and the second U-shaped through grooves U2 are respectively located on two sides of the second protrusion 1211 disposed on the second middle part 120c along the length direction of the core tube 120. Specifically, the first U-shaped through groove U1 has a first curved section U11 and first non-curved sections U12, and the second U-shaped through groove U2 has a second curved section U21 and second non-curved sections U22. The first curved section U11 and the second curved section U21 are close to the corresponding second ends 120a and 120b, respectively, and the ends of the first non-curved sections U12 and the ends of the second non-curved sections U22 face each other and extend toward the second protrusion 1211 disposed on the second middle part 120c.

It may be obtained through experiments that the cross-sectional area (effective cross-sectional area) of the area A2 is smaller than the cross-sectional area (effective cross-sectional area) of the area A1. Therefore, when the core tube 120 is under force, the stress on the area A2 is greater, and the stress on the area A1 is smaller. In other words, the stress received by the area A2 is greater than the stress received by the area A1, thereby achieving the effect of concentrating most of the stress on the core section (that is, the second middle part 120c). Therefore, the energy dissipation device 100 of the embodiment may comply with the BRB specification. Furthermore, the fixing member 140 penetrates through a through hole T1, and as described above, the weakened structure 122 does not extend to the position of the through hole T1. Therefore, the effective cross-sectional area of the position of the through hole T1 is larger, and the stress received is smaller (less than the stress received by the area A2). That is, the position at which the fixing member 140 fixes the core tube 120 is almost under no force, and the fixing member 140 may firmly fix the inner tube 110, the core tube 120 and the outer tube 130 unaffectedly.

In the embodiment, the weakened structure 122 is a U-shaped through groove, but in other embodiments, the weakened structure 122 may be a circular, triangular, or diamond-shaped through groove, and it is not limited thereto.

Figure 6:
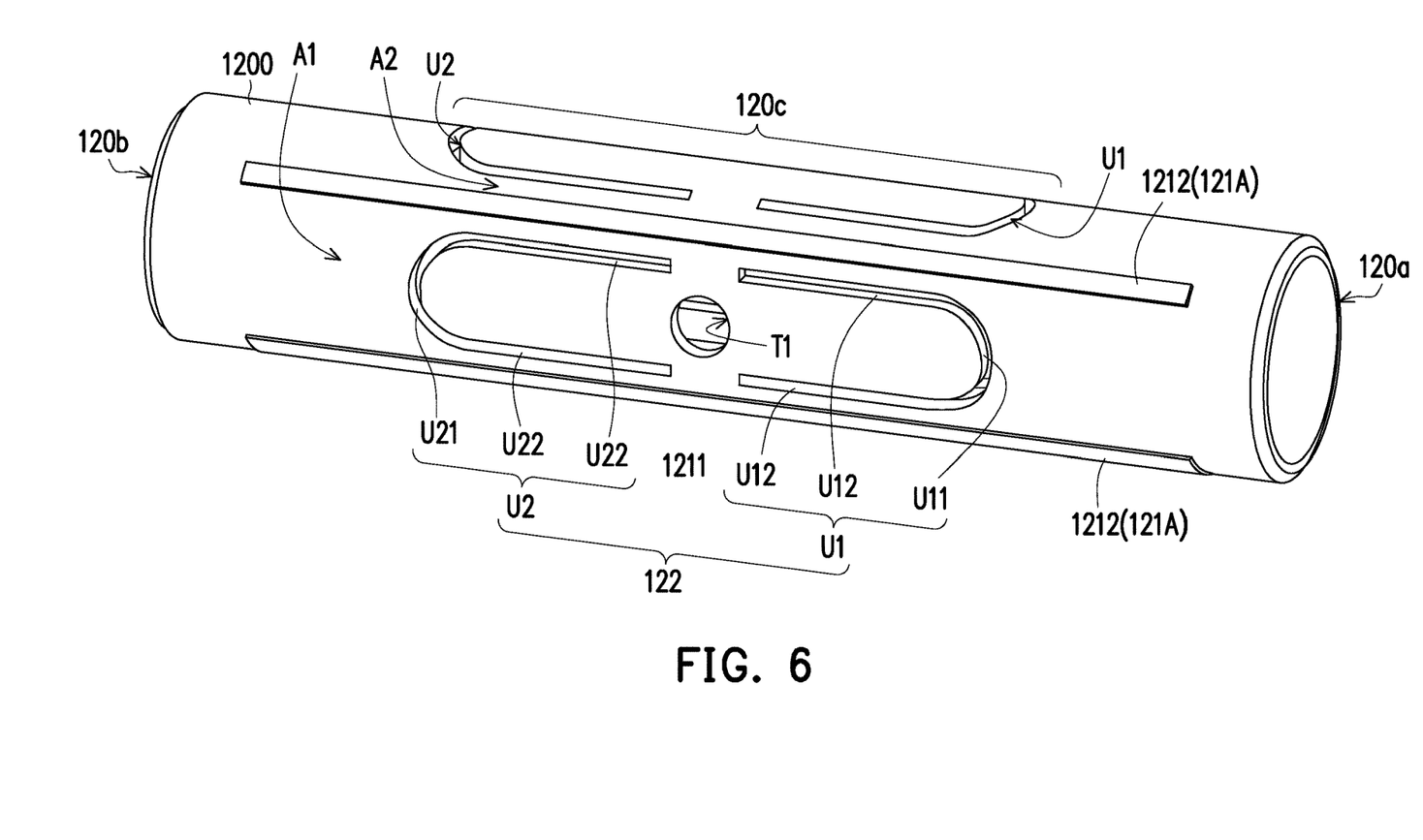
FIG. 6 and FIG. 7 are respectively a schematic perspective view of a core tube according to other embodiments of the disclosure.
Figure 7:
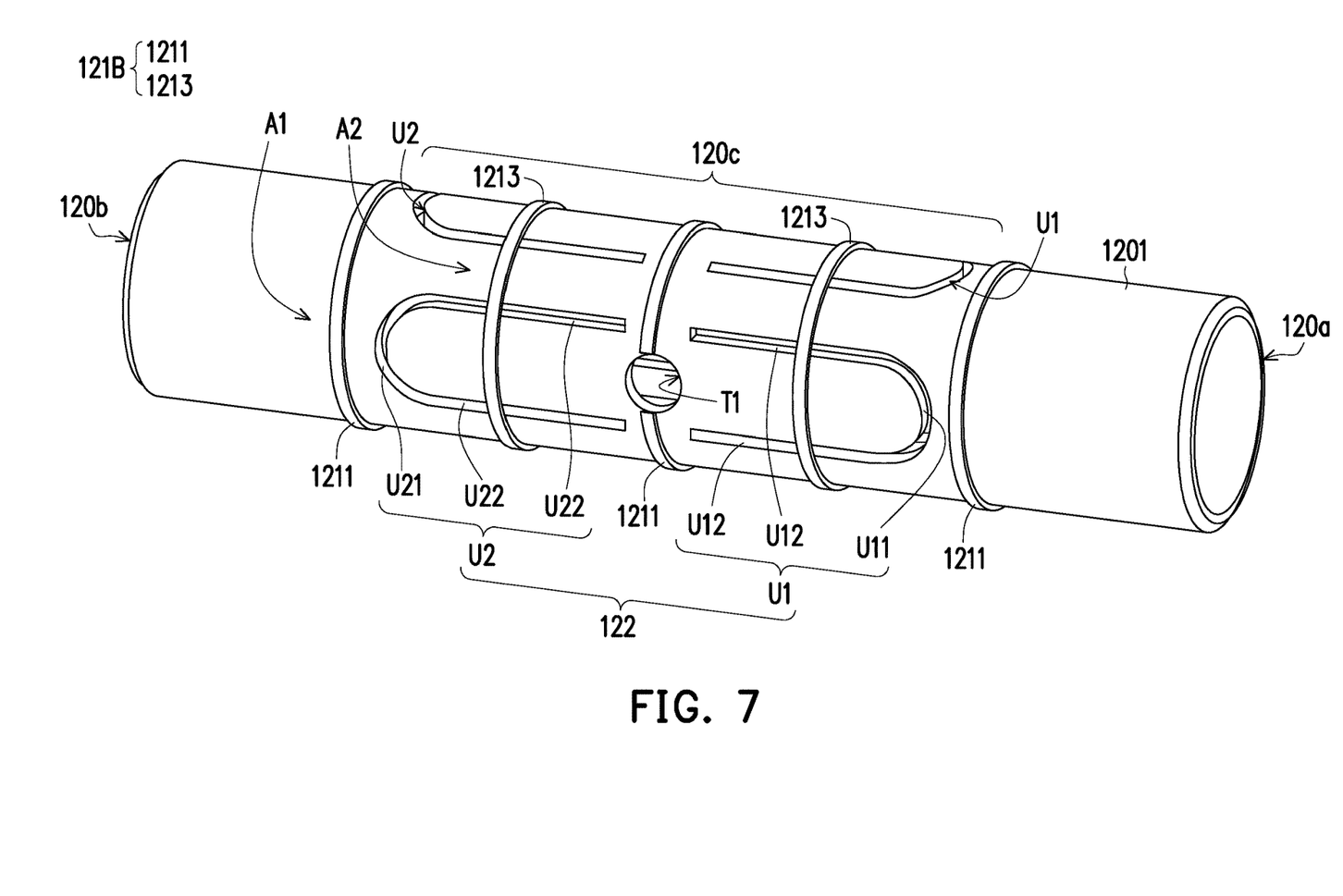

FIG. 6 and FIG. 7 are respectively a schematic perspective view of a core tube according to other embodiments of the disclosure. Please refer to FIG. 6 first. In the embodiment, the core tube 1200 is slightly different from the core tube 120 of FIG. 5 in that the second protruding structure 121A includes a plurality of second protrusions 1212, and that a part of the second protrusion 1212 is located between two adjacent weakened structures 122 (that is, in the area A2) that are disposed circumferentially on the core tube 1200. In other words, the second protrusion 1212 may extend from a portion of the core tube 1200 close to the second end 120a to a portion pointed to by the area A2 and then to a portion close to the second end 120b. In the embodiment, each second protrusion 1212 is a continuous strip-shaped protruding structure along the length direction of the core tube 1200. In an embodiment not shown, the first protruding structure is provided on the inner tube corresponding to the second protruding structure 121A; in other words, the first protruding structure may also be a continuous strip-shaped protruding structure. In other embodiments, each second protrusion 1212 may be a discontinuous strip-shaped protruding structure along the length direction of the core tube 1200, and the disclosure is not limited thereto.

Please refer to FIG. 7. In the embodiment, the core tube 1201 is slightly different from the core tube 120 of FIG. 5 in that the second protruding structure 121B further includes a plurality of second protrusions 1213, and the second protrusions 1213 and the second protrusions 1211 are disposed at equal intervals from one another. In the embodiment, the second protrusions 1213 are, for example, disposed at $3/8$ and $5/8$ positions in the length direction of the core tube 120 to achieve a restraining effect.

Specifically, the second protrusions 1213 are respectively disposed on the first U-shaped through grooves U1 and the second U-shaped through grooves U2. In other words, the second protrusions 1213 surround the area where the first U-shaped through grooves U1 and the second U-shaped through grooves U2 are located. The reason is that as described above, the stress on the area A2 with the smaller cross-sectional area is greater than the stress on the area A1 with the larger cross-sectional area, which increases the possibility of lateral deformation of the area A2. Therefore, in the embodiment, the disposition of the second protrusions 1213 close to the core section (that is, the second middle part 120c) may achieve the effect of increasing the restraining ability.

In summary, in the energy dissipation device of the disclosure, the outer tube, the core tube and the inner tube are sleeved and connected to each other in sequence; the inner tube includes the first protruding structure, and the core tube includes the second protruding structure; the inner tube, the core tube and the outer tube are connected to each other by the fixing member; and the inner tube, the core tube and the outer tube are not in direct contact with each other. When the core tube is under force, the outer tube and the inner tube are configured to prevent the core tube from being laterally buckled, and the core tube will first push against the first protruding structure and/or the second protruding structure so that lateral deformation is restrained, whereby the yield strength may be stably developed. In this way, the energy dissipation device may be configured to withstand the reaction force of the interlayer displacement of the building caused by the earthquake and reduce the structural damage of the building caused by the interlayer displacement. That is, when the building is subjected to an earthquake, the first protruding structure and the second protruding structure are able to increase the restraining effect, whereby the core tube may withstand tension and pressure and may weaken the seismic wave energy received by the building by entering the material yield stage. In this way, the step of pouring concrete required in the conventional method is omitted, and the effects of lighter weight, shorter manufacturing process and increased personnel's production efficiency may be achieved. In addition, the middle part of the core tube has the weakened structure to concentrate the stress on the middle part and to use the middle part to absorb energy.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An energy dissipation device comprising:
   an inner tube comprising a first protruding structure;
   a core tube comprising a second protruding structure and sleeved outside the inner tube;
   an outer tube sleeved outside the core tube; and
   a fixing member connected to the inner tube, the core tube and the outer tube,.
   wherein the inner tube has two opposite first ends and a first middle part between the two first ends, the first protruding structure is disposed on the first middle part, the core tube has two opposite second ends and a second middle part between the two second ends, and the second protruding structure is disposed on the second middle part,
   the core tube has a weakened structure, and the weakened structure is disposed circumferentially on the second middle part, and
   the weakened structure comprises a plurality of first U-shaped through grooves and a plurality of second U-shaped through grooves, and the first U-shaped through grooves and the second U-shaped through grooves are respectively located on two sides of the second protruding structure.

2. The energy dissipation device according to claim 1, wherein there is a first gap between the first protruding structure and an inner wall of the core tube, and there is a second gap between the second protruding structure and an inner wall of the outer tube.

3. The energy dissipation device according to claim 1, wherein the first protruding structure comprises a plurality of first protrusions, the first protrusions are disposed on the inner tube at equal intervals, the second protruding structure comprises a plurality of second protrusions, and the second protrusions are disposed on the core tube at equal intervals.

4. The energy dissipation device according to claim 1, wherein a projection range of the first protrusions on the outer tube overlaps a projection range of the second protrusions on the outer tube.

5. The energy dissipation device according to claim 1, wherein each of the first U-shaped through grooves has a first curved section and a first non-curved section, each of the second U-shaped through grooves has a second curved section and a second non-curved section, the first curved sections and the second curved sections are close to the corresponding second ends, respectively, and ends of the first non-curved sections and ends of the second non-curved sections face each other and extend toward the second protruding structure.

6. The energy dissipation device according to claim 1, wherein the first protruding structure and the second protruding structure are respectively protruding rings and are disposed circumferentially on the inner tube and the core tube, or the first protruding structure and the second protruding structure are respectively protruding strips and are disposed on the inner tube and the core tube along length directions of the inner tube and the core tube.

7. The energy dissipation device according to claim 1, wherein the core tube, the inner tube and the outer tube are hollow steel tubes, and a length of the core tube is greater than a length of the inner tube and also greater than a length of the outer tube.

* * * * *